Aug. 15, 1961 W. L. McGUINNESS 2,996,094
TRACTION ANTI-SKID DEVICES
Filed Dec. 23, 1959 3 Sheets-Sheet 1

Inventor:
Walter L. McGuinness,
by
Attorney

Aug. 15, 1961 W. L. McGUINNESS 2,996,094
TRACTION ANTI-SKID DEVICES
Filed Dec. 23, 1959 3 Sheets-Sheet 2

Inventor:
Walter L. McGuinness,
Attorney

Inventor:
Walter L. McGuinness,
by [signature]
Attorney

United States Patent Office 2,996,094
Patented Aug. 15, 1961

2,996,094
TRACTION ANTI-SKID DEVICES
Walter Leo McGuinness, 88 Marlborough Road,
Waltham, Mass.
Filed Dec. 23, 1959, Ser. No. 861,611
4 Claims. (Cl. 152—233)

This application is a continuation-in-part of my copending patent application Ser. No. 640,884, filed February 18, 1957, for Traction Antiskid Devices, now U.S. Patent 2,918,960, issued December 29, 1959.

It is one object of this invention to generally improve the traction antiskid devices disclosed and claimed in the above patent application and patent, respectively.

It is another object of this invention to provide traction antiskid devices of the type disclosed and claimed in the above patent which are adapted for heavier duty by virtue of the presence of pairs of cross-chains rather than single cross-chains.

Still another object of this invention is to provide traction antiskid devices of the type disclosed and claimed in the above patent which are adapted to be mounted more readily on the wheel of a motorized vehicle, and which have a safety means precluding the devices from becoming loose, once mounted.

A further object of this invention is to provide traction antiskid devices of the type disclosed and claimed in the above patent having a dual function means which dual function means may be used as an aid for mounting the devices on the wheels of motorized vehicles, and which dual function means may also be used for maintaining the devices in position upon having been mounted.

Other objects and advantages of the invention will, in part, be obvious and in part appear hereinafter.

For a more complete understanding of the invention reference may be had to the following detailed description therof taken in connection with the accompanying drawings wherein FIG. 1 is an elevational view of a wheel for a motorized vehicle seen from the front with an antiskid device embodying this invention mounted thereon;

Figure 2:
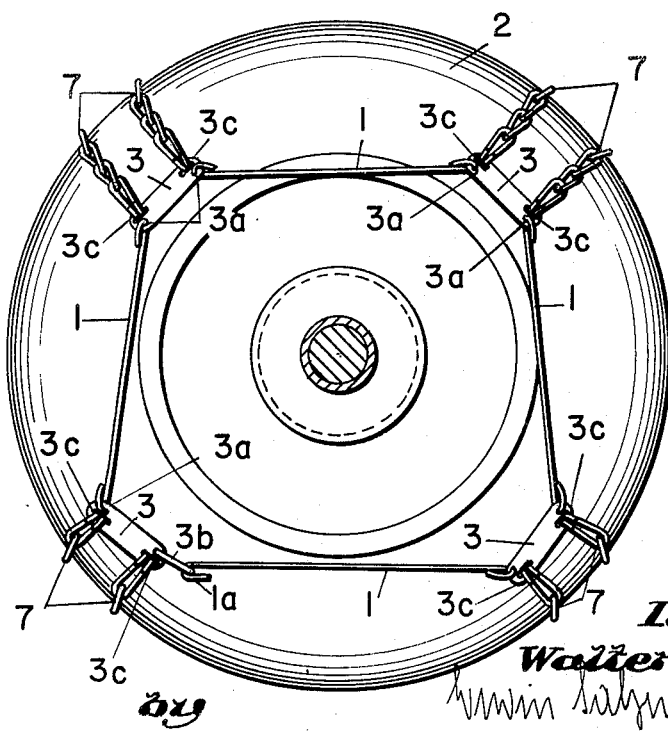
FIG. 2 shows the same structure as FIG. 1 from the rear side of the wheel.

Referring now to the drawings, the antiskid device shown therein comprises a substantially square frame or first wheel-hugging polygon linkage including four relatively long straight rod elements 1 which are of substantially equal length. Rod elements 1 are arranged on the rear side of tire 2. The above frame or polygon linkage further comprises four relatively short connecting bars 3 each arranged in one corner of the frame hugging the rear side of wheel 2. Bars 3 connect immediately adjacent ends of rod elements 1. These ends are pivotally connected to spaced points of connecting bars 3. To this end each connecting bar 3 is provided with a pair of spaced punched-out holes 3a into which the ends of rods 1 are inserted, whereupon the ends of rods 1 are bent about 180 degrees, thus forming a hinged connection between parts 1 and 3. The lower left connecting bar 3 (as seen in FIG. 2) is provided with a chain link 3b adapted to be engaged by a hook 1a formed on the left end of the lowest rod 1. The eye-and-hook lock thus formed is adapted to selectively open and close frame or polygon linkage 1, 3, 1, 3, 1, 3, 1, 3.

A second wheel-hugging frame or polygon linkage including three relatively long rod elements 4 is arranged on the front side of tire 2. Rod elements 4 are of substantially equal length and define a substantially square area. The second polygon linkage or frame further comprises three relatively short connecting bars 5 immediately adjacent the ends of rod elements 4, each at one corner of the frame hugging the front of wheel 2. Each end of each of the three rod elements 4 is pivotally connected to a separate point of one of the three bars 5. To this end each connecting bar 5 is provided with a pair of spaced punched-out holes 5a into which the ends of rods 4 are inserted, whereupon the ends of rods 4 are bent about 180 degrees, thus forming hinged connections between parts 1 and 3. The above-referred to frame or second polygon linkage further includes a pliable element 6 in form of a length of chain or a strap of appropriate material adapted to form a taut tie between spaced ends E, E of the second polygon linkage.

Figure 1:
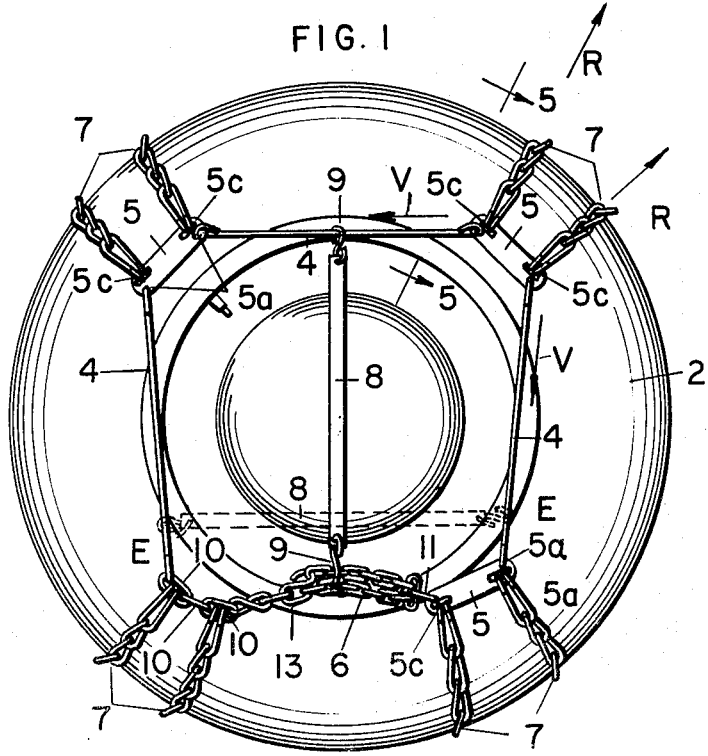

The antiskid device further comprises four pairs of cross-chains 7. Each pair of cross-chains 7 is attached with one end thereof to said first polygon linkage or frame hugging the rear of the wheel, and with the opposite end thereof to said second polygon linkage or frame hugging the front of the wheel. To this end bars 3 have appropriate punched-out holes 3c and bars 5 have appropriate punched-out holes 5c. The front ends of three pairs of chains 7 are inserted into, and attached by means of holes 5c, to bars 5, whereas the rear ends of three pairs of chains 7 are inserted into, and attached by means of holes 3c, to bars 3. It will be apparent from FIGS. 1 and 2 that the polygon linkage or frame on the rear side of wheel 2 (FIG. 2) comprises four connecting bars 3, whereas the polygon linkage or frame on the front side of wheel 2 (FIG. 1) comprises but three connecting bars 5. The lower end of the left rod 4 (as seen in FIG. 1) is inserted into one of three chain links 10. If desired a connecting bar such as that attached to the lower end of the right rod 4 (as seen in FIG. 1) may be substituted for chain links 10. As an alternative, the connecting bar 5 attached to the lower end of the right rod element 4 may be replaced by an element in the form of three chain links such as chain links 10 attached to the lower end of the left rod 4.

Figure 6:
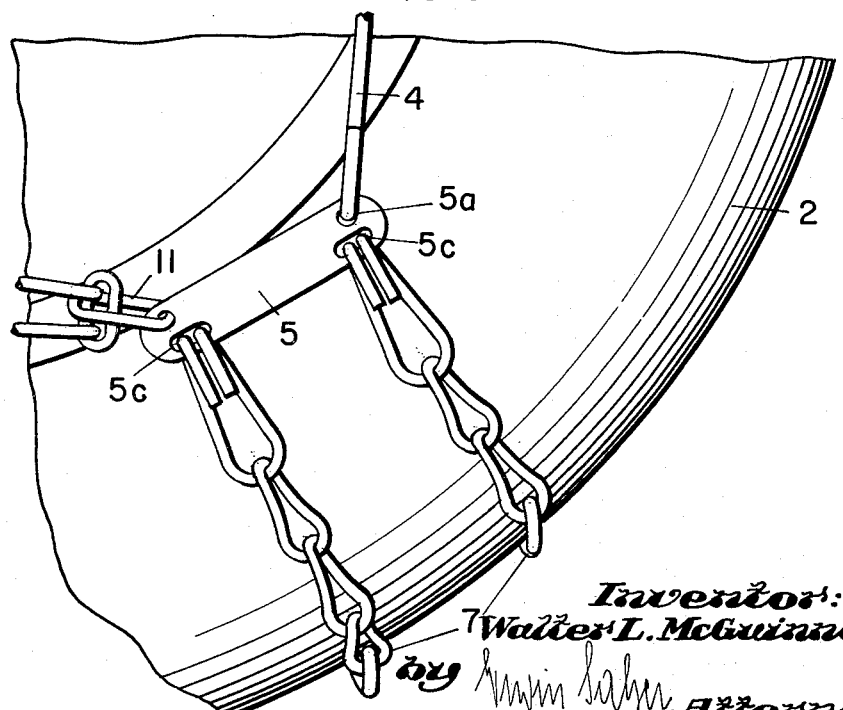
FIG. 6 shows on a larger scale the lower right hand portion of FIG. 1.

As shown in FIG. 1 the antiskid device further comprises a resilient strap 8 stretchable in a direction longitudinally thereof and having S-shaped hook means 9 on both ends thereof. The upper hook 9 engages the center portion of the upper rod 4 of the front frame or front polygon linkage 4, 5, 4, 5 etc. The lower hook 9 engages the chain 6 intended to form a taut tie of variable length between the spaced ends E, E of the right and left rod elements 4 (see FIG. 1). One end of chain 6 is attached to one of links 10, and its opposite end is threaded through chain link 11 on one of the connecting bars 5 (see FIGS. 1 and 6), turned 180 degrees and provided with an S-shaped hook engaging one of its own links. The resilient strap 8 is preferably formed by a length of vulcanized rubber. The function of strap 8 in the position shown in FIG. 1 is to keep the pliable means or chain 6 taut, thus precluding hook 13 from disengaging the chain link into which it has been inserted.

Figure 3:
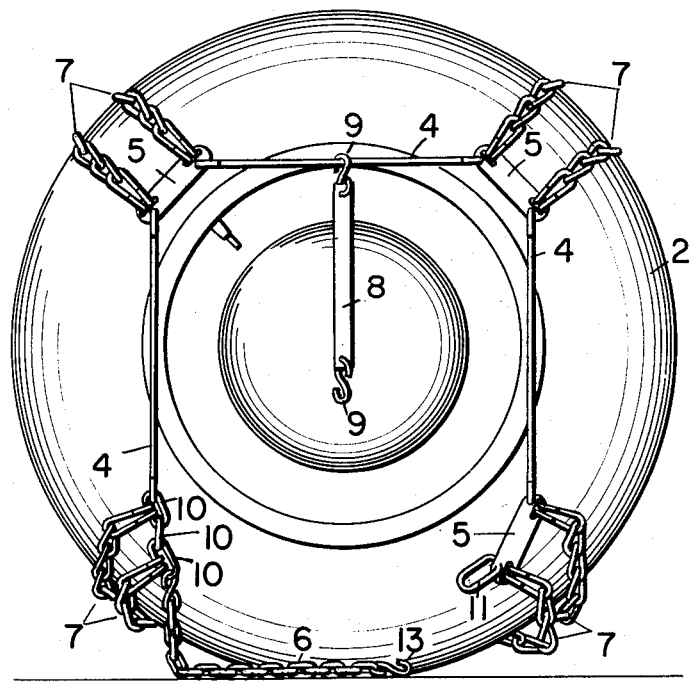
FIG. 3 shows the same view as FIG. 1, the antiskid device not having been fully mounted on the wheel.
Figure 4:
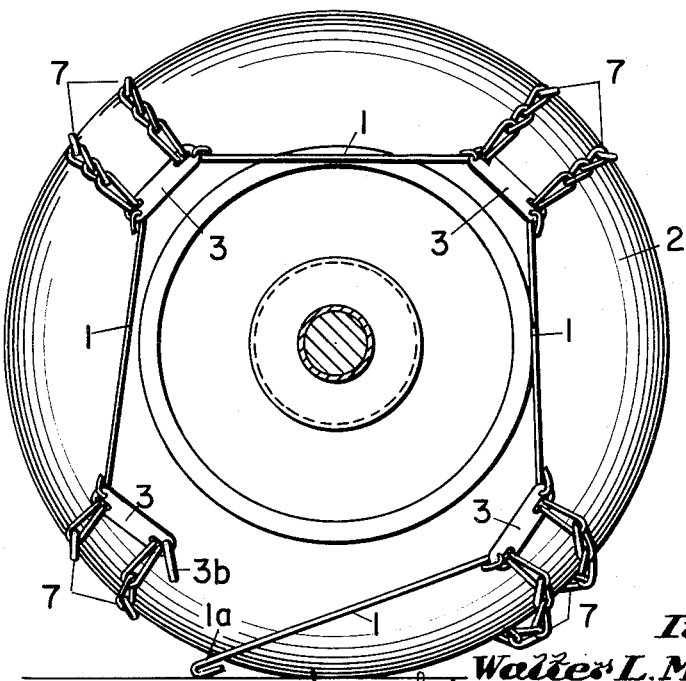
FIG. 4 shows the same view as FIG. 2, the antiskid device not having been fully mounted on the wheel.
Figure 5:
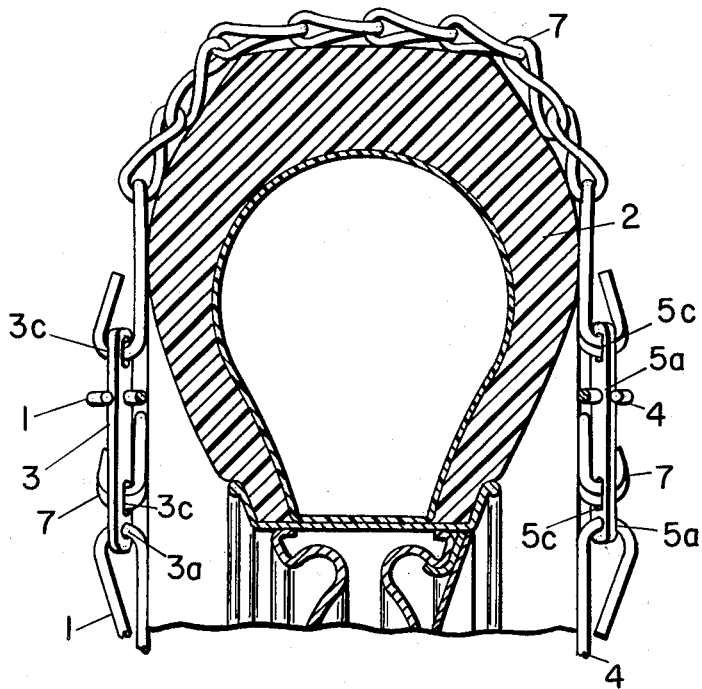
FIG. 5 is a cross-section taken along 5—5 of FIG. 1.

In order to mount the above described antiskid traction device on a tire one proceeds as follows. The device is first placed on a tire in the position shown in FIGS. 3 and 4. In order to do so the eye-and-hook lock 3b, 1a must be opened and the chain 6 must be untied, as clearly shown in FIGS. 3 and 4. When the antiskid device has thus been placed on a wheel, first the eye-and-hook lock 3b, 1a is closed or locked, as shown in FIG. 2 and thereupon strap 8 is hooked at E, E to the polygon linkage on the front of the tire 2, as indicated in FIG. 1 by dotted lines. As a result, the left and right rods 4 are pulled together so as to slightly converge, as indicated in FIG. 1. This makes it possible to conveniently thread chain 6 through link 11 (FIGS. 1, 3 and 6) and to insert hook 13 in any desired link of chain 6. At this point of the mounting operation chain 6 is not entirely taut as yet. Now strap 8 is removed from its position shown in FIG. 1 in dotted lines, and placed in the position indicated in FIG. 1 by solid lines. This brings chain 6 in the taut position shown in FIG. 1, safely precluding disengagement of hook 13 from the link in chain 6 into which it has previously been inserted.

It will be apparent from the foregoing that the antiskid traction device embodying this invention differs in two important points from the antiskid traction devices disclosed and claimed in the parent Patent 2,918,960 referred to above.

The annular rod-connecting corner elements of the device disclosed in the parent application have been replaced by the short bars 3 and 5, making it possible to replace each single cross-chain of the antiskid device disclosed in the parent application by a pair of cross-chains. By virtue of this change the device has been adapted for heavier duty.

The other improvement of the antiskid device disclosed in the parent application consists in the addition of the dual function strap 8, 9 which is a mounting aid as well as a safety means precluding unintentional disengagement of hook 13 from chain 6. It will be apparent that each pair of cross-chains 7 will be subjected to a stress which is equal to the sum of the vectors in the front and rear polygon linkages at the points of attachment of cross-chains 7 to said linkages. Thus the sum of vectors V in rods 4 indicated in FIG. 1 acts at the center of bar 5 and the sum of vectors R in chains 7 acts at the center of bar 5 and keeps the first mentioned sum of vectors in balance.

Having disclosed a preferred embodiment of the invention it is desired that the same be not limited to the particular structure disclosed. It will be obvious to any person skilled in the art that many modifications and changes may be made without departing from the broad spirit and scope of the invention. Therefore it is desired that the invention be interpreted as broadly as possible and that it be limited only as required by the prior state of the art.

I claim as my invention:

1. An antiskid traction device for wheels of motorized vehicles comprising a substantially square frame for hugging the rear side of a wheel, said rear-side-hugging frame including four straight relatively long rear rods of fixed length enclosing substantially right angles, four relatively short rear connecting bars on the ends of said four rear rods each defining a pair of spaced holes for connecting a pair of said four rear rods, and an eye-and-hook lock adapted to selectively open and close said rear-side-hugging frame; a substantially square frame for hugging the front side of a wheel, said front-side-hugging frame including three straight relatively long front rods of fixed length enclosing substantially right angles, at least two relatively short front connecting bars on the ends of said three front rods each defining a pair of spaced holes engaged by a pair of said three front rods, and a pliable element adapted to form a taut tie of variable length between spaced ends of two of said three front rods; and four pairs of cross-chains each pair directly engaging at spaced points one of said four rear connecting bars of said rear-side-hugging frame and each of said four pairs of cross-chains directly engaging said front-side-hugging frame and some of said four pairs of cross-chains engaging at spaced points some of said front connecting bars.

2. An antiskid traction device as specified in claim 1 comprising a resilient strap stretchable in a direction longitudinally thereof and having hook means on both ends thereof, said hook means being adapted to either engage the center of said taut tie and the center of one of said three front rods opposite said taut tie, or to engage spaced ends of two of said three front rods.

3. An antiskid traction device for wheels for motorized vehicles comprising a first wheel-hugging polygon linkage including four relatively long rod elements of substantially equal length and four relatively short elements pivotally connecting immediately adjacent ends of said four rod elements, said first polygon linkage further including an eye-and-hook lock adapted to selectively open and close said first polygon linkage; a second wheel-hugging polygon linkage including three relatively long rod elements of substantially equal length and two relatively short connecting elements pivotally connecting immediately adjacent ends of said three rod elements, said second polygon linkage further including a pliable element adapted to form a taut tie of variable length between spaced ends of two of said three rod elements; four cross-chain means each directly attached with one end thereof to one corner of said first polygon linkage and directly attached with the opposite end thereof to one corner of said second polygon linkage, and a resilient strap stretchable in a direction longitudinally thereof and having hook means on both ends thereof, said hook means being adapted to engage the center of said taut tie and the center of one of said three rod elements opposite said taut tie, and said hook means being adapted to engage spaced ends of said second polygon linkage.

4. An antiskid traction device as specified in claim 3 wherein said pliable element is formed by a chain, said resilient strap is formed by a length of rubber, and said hook means is formed by a pair of S-shaped metal parts.

References Cited in the file of this patent

UNITED STATES PATENTS

| | | |
|---|---|---|
| 2,176,631 | Kunkle | Oct. 17, 1939 |
| 2,711,770 | Conoscente et al. | June 28, 1955 |